US009850880B2

(12) United States Patent
Puls

(10) Patent No.: US 9,850,880 B2
(45) Date of Patent: Dec. 26, 2017

(54) SYSTEM FOR SERVICING WIND TURBINE ROTOR

(71) Applicant: General Electric Company, Schenectady, NY (US)

(72) Inventor: Ingo Puls, Belm (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 506 days.

(21) Appl. No.: 14/548,530

(22) Filed: Nov. 20, 2014

(65) Prior Publication Data

US 2016/0146183 A1    May 26, 2016

(51) Int. Cl.

| F03D 13/10 | (2016.01) |
|---|---|
| F03D 1/00 | (2006.01) |
| B66F 3/24 | (2006.01) |
| F03D 1/06 | (2006.01) |
| F03D 80/50 | (2016.01) |
| F03D 80/70 | (2016.01) |

(52) U.S. Cl.
CPC ............ *F03D 1/003* (2013.01); *B66F 3/24* (2013.01); *F03D 1/06* (2013.01); *F03D 13/10* (2016.05); *F03D 80/50* (2016.05); *F03D 80/70* (2016.05); *F05B 2230/61* (2013.01); *Y02E 10/721* (2013.01); *Y02P 70/523* (2015.11); *Y10T 29/49318* (2015.01)

(58) Field of Classification Search
CPC .......... F03D 1/003; F03D 80/70; F03D 80/50; F03D 13/10; F03D 1/06; B66F 3/24; Y02P 70/523; Y02E 10/721; F05B 2230/61; Y10T 29/49318
See application file for complete search history.

(56) References Cited

U.S. PATENT DOCUMENTS

| 2011/0138595 A1 | 6/2011 | Shiraishi et al. |
| 2014/0010658 A1 | 1/2014 | Nielsen |

FOREIGN PATENT DOCUMENTS

| CA | 2692705 A1 | 8/2010 |
| EP | 2775137 A2 | 9/2014 |
| WO | 2011064659 A2 | 6/2011 |
| WO | 2012065613 A9 | 5/2012 |

OTHER PUBLICATIONS

European Search Report issued in connection with corresponding EP Application No. 15195031.8 dated Apr. 13, 2016.

*Primary Examiner* — Sarang Afzali
*Assistant Examiner* — Ruth G Hidalgo-Hernandez
(74) *Attorney, Agent, or Firm* — Douglas D. Zhang; GE Global Patent Operations

(57) ABSTRACT

A system for enabling servicing of a rotor of a wind turbine is provided. A rotor servicing fixture attaches to a first and second rotor blade, and contacts a wind turbine tower. A clamp assembly is connected to the rotor servicing fixture, and clamps onto a third rotor blade. The clamp assembly lowers the third rotor blade from a hub and raises it back to the hub. A lifting assembly is connected to the rotor servicing fixture and the clamp assembly, and is configured for raising and lowering the third rotor blade via the clamp assembly. A slide assembly is connected to the rotor servicing fixture, and is configured to support the rotor part and to slidably move the rotor part away from or towards the wind turbine. The system enables the rotor part to be removed or replaced without requiring the rotor to be removed from the wind turbine.

8 Claims, 18 Drawing Sheets

SYSTEM FOR SERVICING WIND TURBINE ROTOR

FIELD OF THE INVENTION

The present subject matter relates generally to wind turbines and, more particularly, to an improved method and system for enabling servicing of the rotor of the wind turbine without completely removing the rotor from the wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of the wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy. A power converter typically regulates the flow of electrical power between the generator and a grid.

Typically, to initially install a rotor blade onto the wind turbine hub and/or to remove or lower one of the existing rotor blades from the hub, a significantly large crane must be transported to the wind turbine site in order to provide a means for raising and/or lowering the rotor blade relative to the hub. Unfortunately, it is often extremely expensive to both transport the crane to the wind turbine site and operate the crane for the amount of time necessary to install and/or remove/lower the rotor blade(s). As a result, the costs of employing such large cranes currently accounts for a significant portion of the overall costs associated with initial wind turbine installations and rotor maintenance or service operations.

Accordingly, an improved method and related system for lowering wind turbine rotor blades to enable rotor service that do not require the use of a significantly large crane would be welcomed in the technology, and the improved method and related system would make wind power more economically competitive with other forms of power generation.

BRIEF DESCRIPTION OF THE INVENTION

Aspects and advantages of the invention will be set forth in part in the following description, or may be obvious from the description, or may be learned through practice of the invention.

In one aspect of the invention, a system is provided for enabling servicing of a rotor of a wind turbine. The system includes a rotor servicing fixture configured to attach to and be supported by a first rotor blade and a second rotor blade. The rotor servicing fixture is configured to contact a tower of the wind turbine. A clamp assembly is connected to the rotor servicing fixture. The clamp assembly is configured to clamp onto a third rotor blade. The clamp assembly is configured to lower the third rotor blade from a hub, and to raise the third lower blade back to the hub. A lifting assembly is connected to the rotor servicing fixture and the clamp assembly. The lifting assembly is configured for raising and lowering the third rotor blade via the clamp assembly. A slide assembly is connected to the rotor servicing fixture. The slide assembly is configured to support the rotor part and to slidably move the rotor part away from and/or towards the wind turbine. The system enables the rotor part to be removed and/or replaced without requiring the rotor to be removed from the wind turbine.

In another aspect, a method is provided for servicing a rotor of a wind turbine. An attaching step attaches a rotor servicing fixture to the rotor of the wind turbine. The rotor servicing fixture is configured to attach to and be supported by a first rotor blade and a second rotor blade. The rotor servicing fixture is configured to contact a tower of the wind turbine. A second attaching step attaches a clamp assembly onto a third rotor blade. The clamp assembly is connected to the rotor servicing fixture. The clamp assembly is configured to clamp onto the third rotor blade. A lowering step lowers the third rotor blade by a predetermined amount with the clamp assembly and a lifting assembly. The clamp assembly is configured to lower the third rotor blade from a hub and to raise the third lower blade back to the hub. The lifting assembly is connected to the rotor servicing fixture and the clamp assembly. The lifting assembly is configured for raising and lowering the third rotor blade via the clamp assembly. A servicing step services the rotor part, and the servicing step is performed without removing the rotor from the wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
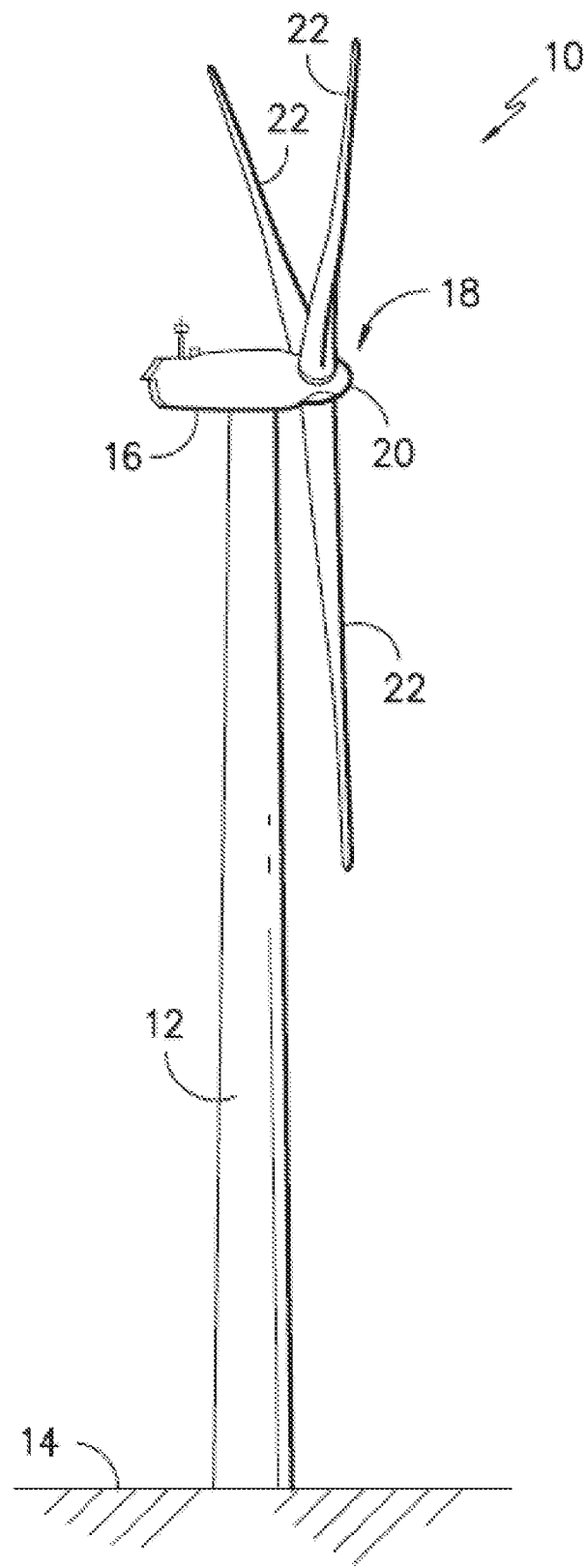
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method and system for lowering a rotor blade from a hub and removing or installing a rotor part without having to use a crane to lower the entire rotor or blade to the ground. Specifically, as will become apparent from the description provided below, the disclosed method and system avoids the use of a large, expensive crane capable of raising or lowering the entire rotor, thereby significantly reducing the costs associated with blade lowering and re-installation.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
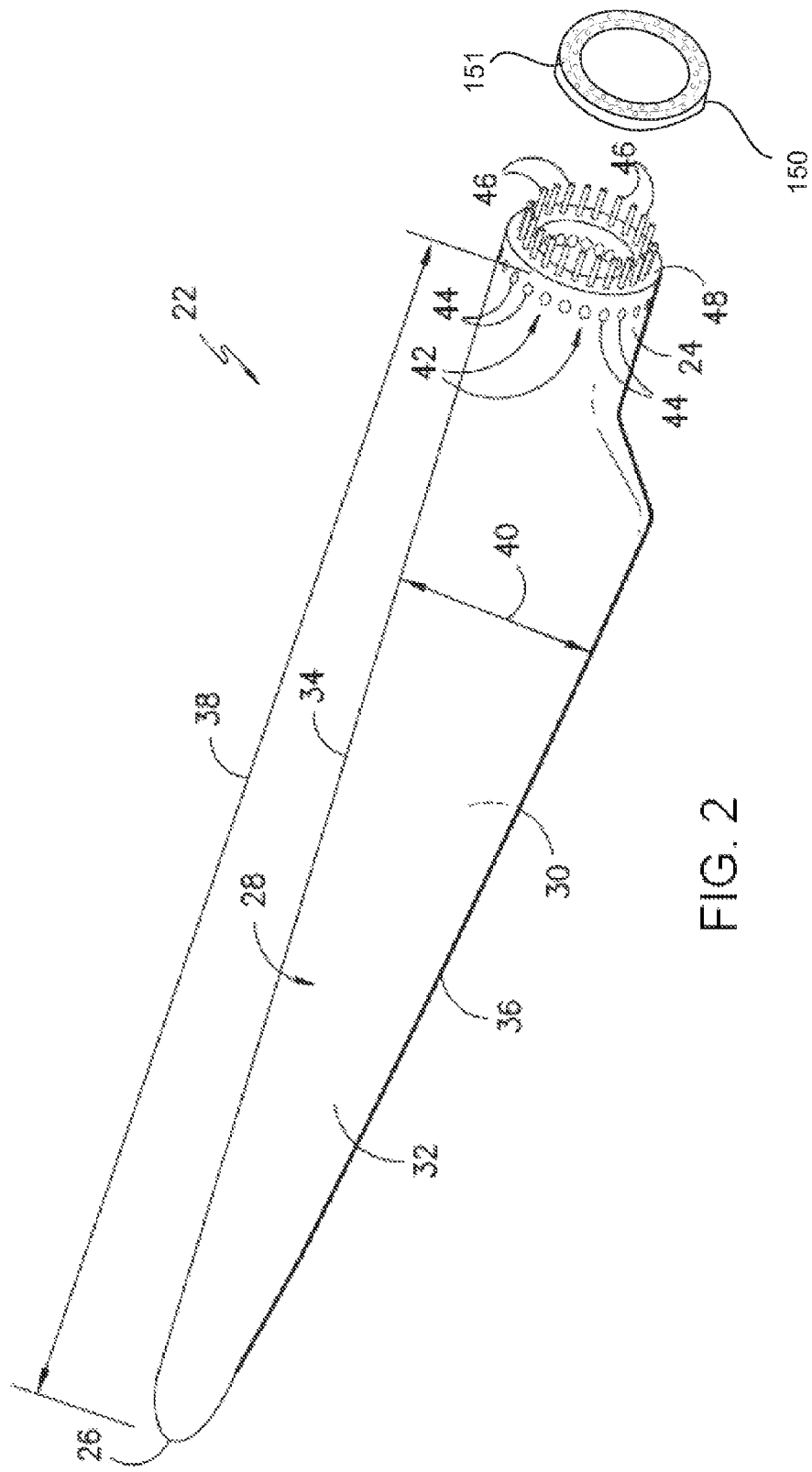
FIG. 2 illustrates a perspective view of one of the rotor blades of the wind turbine shown in FIG. 1.

Referring now to FIG. 2, a perspective view of one of the rotor blades 22 shown in FIG. 1 is illustrated in accordance with aspects of the present subject matter. As shown, the rotor blade 22 includes a blade root 24 configured for mounting the rotor blade 22 to the hub 20 of a wind turbine 10 and a blade tip 26 disposed opposite the blade root 24. A body 28 of the rotor blade 22 may extend lengthwise between the blade root 24 and the blade tip 26 and may generally serve as the outer shell of the rotor blade 22. As is generally understood, the body 28 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 28 may generally include a pressure side 30 and a suction side 32 extending between a leading edge 34 and a trailing edge 36. Additionally, the rotor blade 22 may have a span 38 defining the total length of the body 28 between the blade root 24 and the blade tip 26 and a chord 40 defining the total length of the body 28 between the leading edge 34 and the trailing edge 36. As is generally understood, the chord 40 may vary in length with respect to the span 38 as the body 28 extends from the blade root 24 to the blade tip 26.

Moreover, as shown in FIG. 2, the rotor blade 22 may also include a plurality of T-bolts or root attachment assemblies 42 for coupling the blade root 24 to the hub 20 of the wind turbine 10. In general, each root attachment assembly 42 may include a barrel nut 44 mounted within a portion of the blade root 24 and a root bolt 46 coupled to and extending from the barrel nut 44 so as to project outwardly from a root end 48 of the blade root 24. By projecting outwardly from the root end 48, the root bolts 46 may generally be used to couple the blade root 24 to the hub 20 via a pitch bearing 150 of the wind turbine 10. For example, the pitch bearing 150 may define a plurality of bolt holes 151 configured to receive the root bolts 46. Additionally, as will be described below, a portion of such root bolts 46 may also be utilized when the rotor blade 22 is being lowered or removed from and/or re-installed onto the hub 20.

It should be appreciated that, although the methods will generally be described with reference to lowering a rotor blade 22 from the hub 20 of wind turbine 10, the various method steps and system components disclosed herein may similarly be used to re-install the rotor blade 22 onto the hub 20 by simply reversing the order in which the method is performed. It should also be appreciated that, although the methods will be described herein as being performed in a particular order, the methods may generally be performed in any suitable order that is consistent with the disclosure provided herein.

Figure 3:
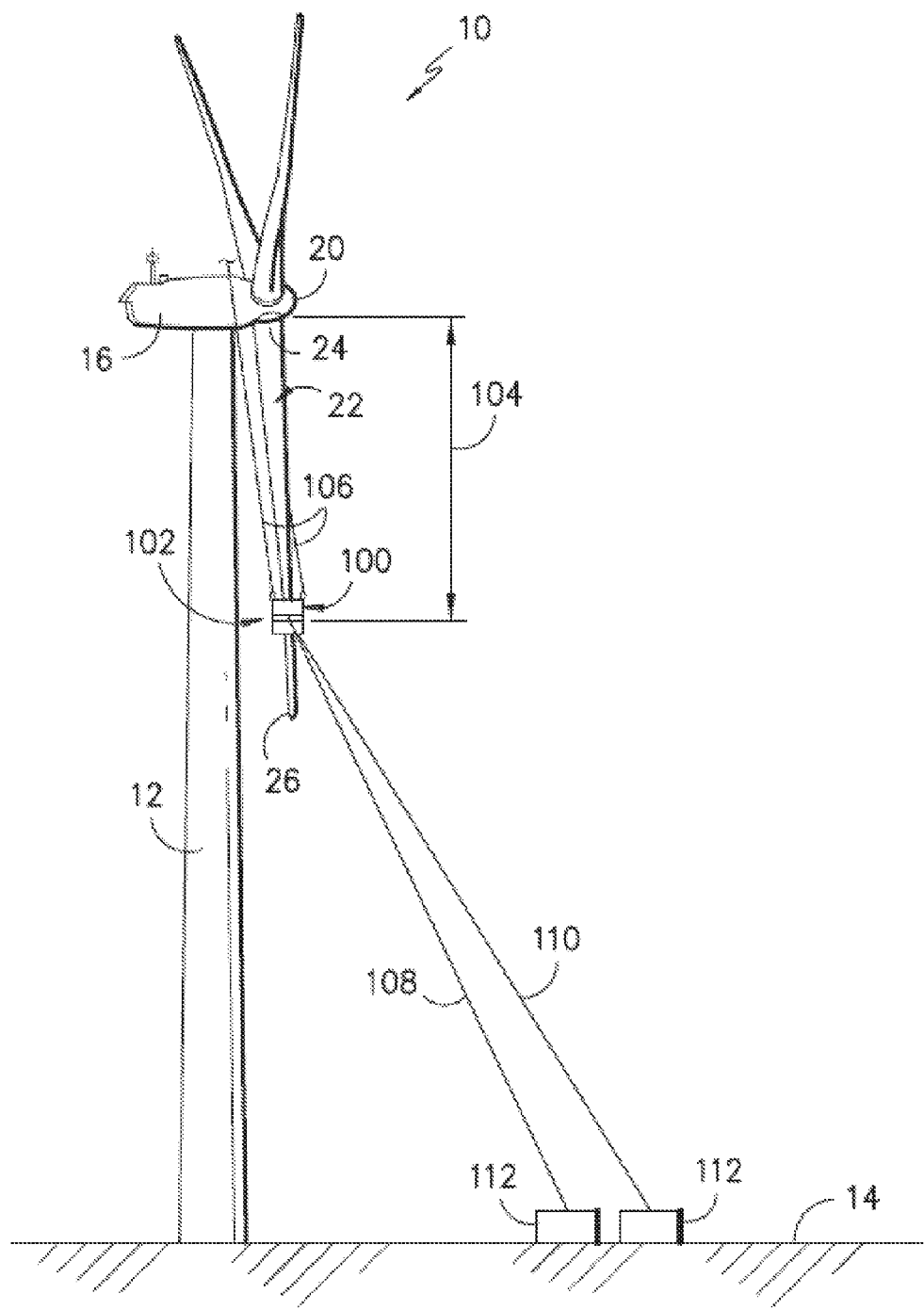
FIG. 3 illustrates another perspective view of the wind turbine shown in FIG. 1, particularly illustrating a rotor blade to be removed from the wind turbine positioned in a generally vertical orientation relative to a support surface of the wind turbine and a blade sock installed onto the rotor blade.

Referring particularly to FIG. 3, the rotor blade 22 to be lowered may be initially rotated to a vertically downward position (e.g., a 6 o'clock position) such that the blade 22 has a generally vertical orientation relative to the support surface 14 of the wind turbine 10. The other two blades 22 will be at the 10 o'clock and 2 o'clock positions. For example, as shown in FIG. 3, one rotor blade 22 is extending vertically downward from the hub 20 such that the blade tip 26 is pointing towards the support surface 14. It should be appreciated that, due to a tilt angle and/or cone angle of the wind turbine 10, the rotor blade 22 may be angled slightly away from the tower 12 when moved to the vertically downward position.

In several embodiments, once the rotor blade 22 is rotated to the vertically downward position, a blade sock 100 may be installed onto the blade 22 at an intermediate location 102 defined between the blade root 24 and the blade tip 26. In one embodiment, the intermediate location 102 may correspond to a location defined along an outboard section of the rotor blade 22, such as at a location spaced apart from the blade root 24 by a distance 104 that is greater that about 50% of the blade span 38. For example, the distance 104 may range from about 50% of the span 38 to about 95% of the span 38, such as from about 65% of the span 38 to about 95% of the span 38 or from about 75% of the span 38 to about 90% of the span 38 and any other subranges therebetween.

As shown in FIG. 3, to install the blade sock 100 onto the rotor blade 22, one or more lift cables 106 may be secured to the blade sock 100 and may extend upward to an up-tower location, such as at a location on and/or within the hub 20 or the nacelle 16. For instance, in one embodiment, the lift cable(s) 106 may extend upward from the blade sock 102 to personnel located within and/or on top of the hub 20 or the nacelle 16. Regardless, the lift cable(s) 106 may be used to lift the blade sock 100 vertically upwards relative to the support surface 14 to allow the sock 100 to be installed around the rotor blade 22 at the intermediate location 102. For instance, as will be described below, the blade sock 100 may define a closed shape configured to extend around the entire outer perimeter of the rotor blade 22. Thus, when lifting the blade sock 100 via the lift cable(s) 102, the sock 100 may be carefully aligned with the rotor blade 22 such that the blade tip 26 is received within the sock 100.

Additionally, one or more sock cables 108, 110 may also be coupled to the blade sock 100 and may extend downward to a location adjacent to the support surface 14. For instance, in the illustrated embodiment, the system includes a first sock cable 108 and a second sock cable 110 coupled between the blade sock 100 and corresponding winches 112 disposed on and/or adjacent to the support surface 14. The sock cables 108, 110 may, for example, be utilized to assist in aligning the blade sock 100 with the rotor blade 22 as the sock 100 is being lifted up onto the blade 22 via the lift cables 106. In addition, as will be described below, the sock cable(s) 108, 110 may also be used as a means for tightening the blade sock 100 around the rotor blade 22 at the intermediate location 102 and/or for applying a force through the blade sock 100 in order to adjust and/or control the orientation of the rotor blade 22 as it is being lowered below the hub 20. In alternative embodiments, the cables 108, 110 may be replaced by ropes so that they function as tag lines.

Figure 4:
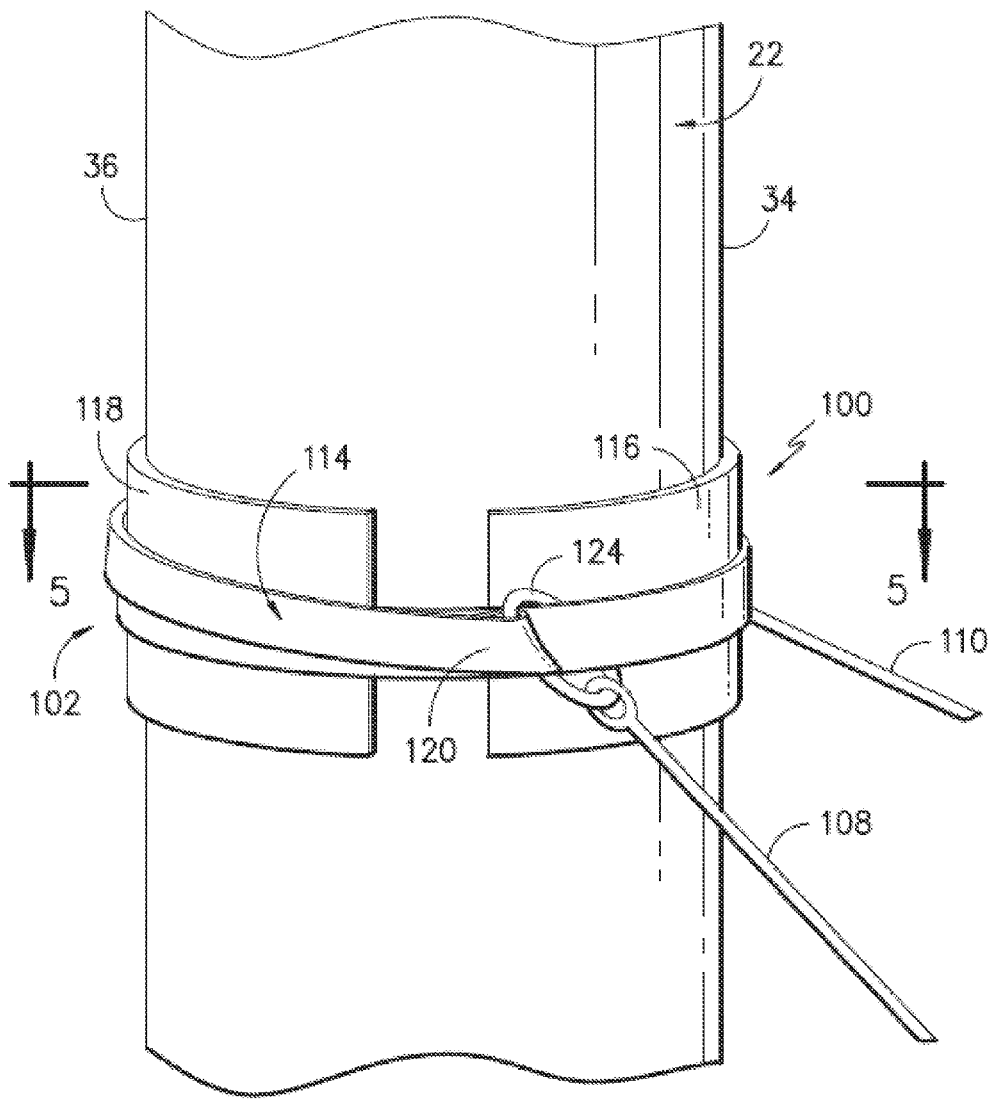
FIG. 4 illustrates a close-up, partial perspective view of the rotor blade and the blade sock shown in FIG. 3.
Figure 5:
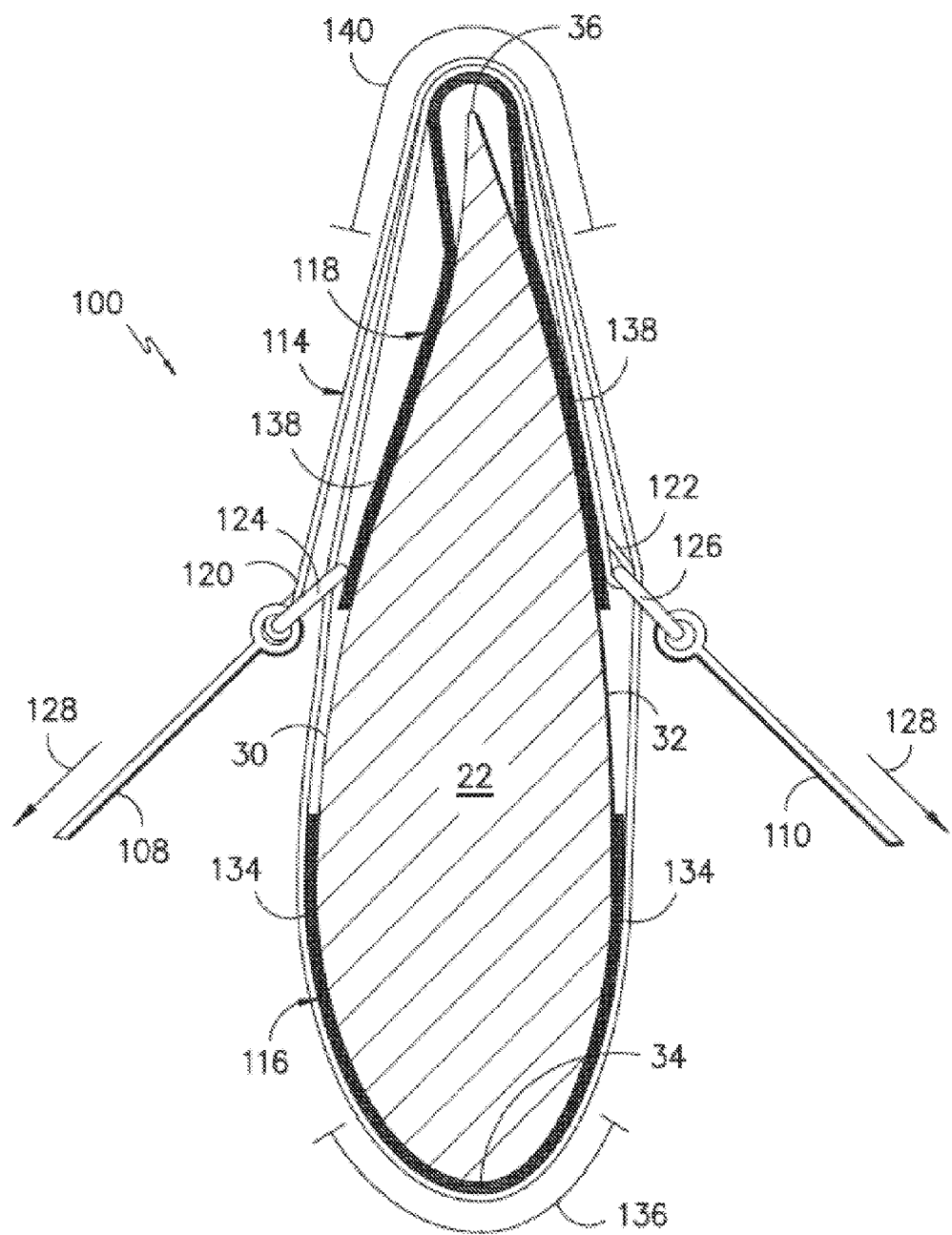
FIG. 5 illustrates a cross-sectional view of the rotor blade and blade sock shown in FIG. 4 taken about line 5-5.
Figure 6:
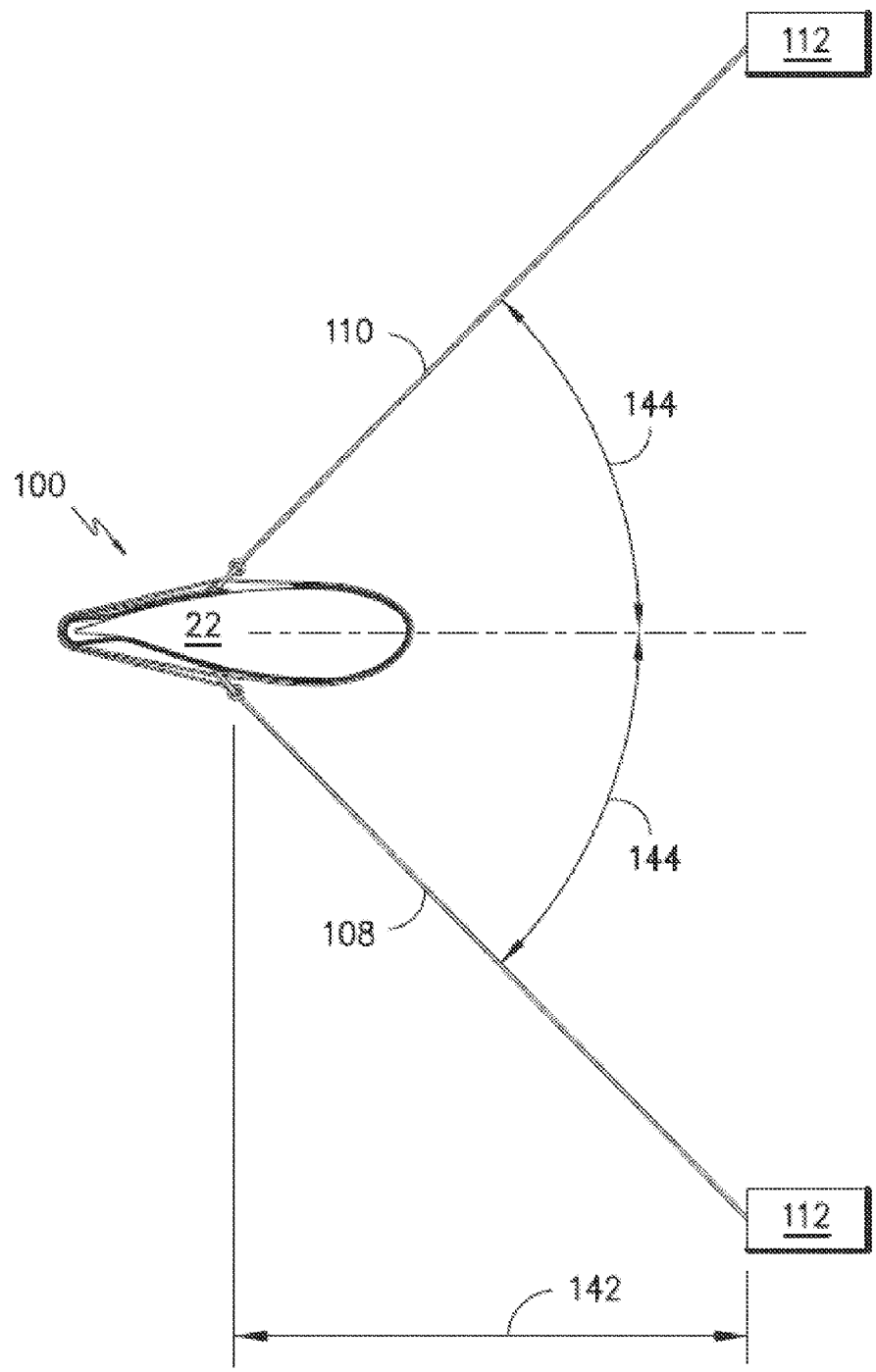
FIG. 6 illustrates a top-down view of the cross-section shown in FIG. 5 relative to a support surface of the wind turbine, particularly illustrating sock cables extending from the blade sock to corresponding winches supported on and/or adjacent to the support surface.

Referring now to FIGS. 4-6, differing views of one embodiment of the blade sock 100 described above are illustrated in accordance with aspects of the present subject matter. Specifically, FIG. 4 illustrates a close-up, perspective view of the blade sock 100 installed onto the rotor blade 22 at the intermediate location 102 with the lift cables 106 being removed and FIG. 5 illustrates a cross-sectional view of the blade sock 100 shown in FIG. 4 taken about line 5-5. Additionally, FIG. 6 illustrates top-down view of the cross-section shown in FIG. 5, particularly illustrating the sock cables 108, 110 extending from the blade sock 100 to corresponding winches 112 disposed on and/or adjacent to the support surface 14.

As particularly shown in FIGS. 4 and 5, the blade sock 100 may include a sock strap 114 generally defining a closed shape configured to extend around the outer perimeter of the rotor blade 22. In addition, the blade sock 100 may include one or more edge supports 116, 118 positioned between the sock strap 114 and the rotor blade 22. For example, as shown in the illustrated embodiment, the blade sock 100 includes both a leading edge support 116 positioned between the sock strap 114 and the rotor blade 22 around the location of the leading edge 34 of the blade 22 and a trailing edge support 118 positioned between the sock strap 114 and the rotor blade 22 around the location of the trailing edge 36 of the blade 22.

In general, the sock strap 114 may be configured to be tightened around the outer perimeter of the rotor blade 22 in order to secure the blade sock 100 to the blade 22 at the intermediate location 102. In several embodiments, the sock strap 114 may be configured to be self-tightening. For example, as shown in FIG. 5, the sock strap 114 may extend lengthwise between a first end 120 and a second end 122. In addition, the sock strap 114 may include suitable coupling mechanisms (e.g., mount rings or hooks or any other suitable coupling device) positioned at the ends 120, 122 of the strap 114 for coupling each end 120, 122 to one of the sock cables 108, 110. Specifically, as shown in FIG. 5, a first mount ring 124 may be secured to the first end 120 of the sock strap 114 and a second mount ring 126 may be secured to the second end 122 of the sock strap 114. In such an embodiment, the sock strap 114 may be configured to be looped around the outer perimeter of the rotor blade 22 in a partially overlapping manner such that the first mount ring 124 is disposed on one side of the rotor blade 22 (e.g., the pressure side 30) and the second mount ring 126 is disposed on the opposite side of the rotor blade 22 (e.g., the suction side 32). As such, when the sock cables 108, 110 are coupled to the mount rings 124, 126 and subsequently pulled or otherwise tensioned (e.g., via the winches 112) so as to apply a tightening force at each end 120, 122 of the sock strap 114 (indicated by arrows 128 in FIG. 5), the strap 114 may be configured to tighten around the outer perimeter of the rotor blade 22, thereby securing the blade sock 100 to the rotor blade 22.

The edge supports 116, 118 of the blade sock 100 may generally correspond to any suitable rigid support-type members configured to prevent damage to the leading and trailing edges 34, 36 of the rotor blade 22 as the sock strap 114 is tightened around the blade 22 and/or as the blade sock 100 is used to at least partially support the weight of the rotor blade 22 (as will be described below). For example, as shown in FIG. 5, the leading edge support 116 may include side portions 134 configured to extend along portions of the pressure and suction sides 30, 32 of the rotor blade 22 and may also include an edge portion (indicated by bracket 136) extending between the side portions 134 around leading edge 34. Specifically, the edge portion 136 may be configured to define a curved profile generally corresponding to the curved profile of the leading edge 34 of the blade 22 such that the edge portion 136 wraps around and provides a nesting configuration for the leading edge 34. Similarly, the trailing edge support 118 may include side portions 138 configured to extend along portions of the pressure and suction sides 30, 32 of the rotor blade 22 and may also include an edge portion (indicated by bracket 140) extending between the side portions 138 around the trailing edge 36. However, unlike the edge portion 136 of the leading edge support 116, the edge portion 140 may be configured to extend around the trailing edge 36 such that a gap is defined between the trailing edge 36 and the corresponding support 116, thereby providing a buffer to prevent compression forces applied via the tightened sock strap 114 from being directed through the trailing edge 36.

It should be appreciated that the edge supports 116, 118 may generally be configured to be formed from any suitable rigid material. For instance, in one embodiment, the edge supports 116, 118 may be formed from a fiber-reinforced laminate composite, such as a carbon and/or glass fiber-reinforced laminate. Alternatively, the edge supports 116, 118 may be formed from any other suitable rigid material, such as any suitable metal and/or any suitable rigid polymer-containing material. Additionally, in several embodiments, for the portions of the edge supports 116, 118 configured to contact the outer surface of the rotor blade 22, the edge supports 116, 118 may include an inner layer (not shown) formed from a suitable cushioning material in order to protect the blade's outer surface. For instance, the inner layer may be formed from a foamed material or any other suitable soft and/or cushioning material.

It should also be appreciated that, although the edge supports 116, 118 are shown in the illustrated embodiments as two separate components, the edge supports 116, 118 may, instead, be configured as a single component configured to extend around the entire outer perimeter of the rotor blade 22. Additionally, in alternative embodiments, the blade sock 100 may only include one of the edge supports 116, 118, such as by only including the trailing edge support 118.

Referring to FIG. 6, as indicated above, the sock cables 108, 110 may, in one embodiment, be configured to be coupled between the blade sock 100 and corresponding winches 112 disposed on and/or adjacent to the wind turbine's support surface 14. In such an embodiment, the positioning of the winches 112 relative to the position of the rotor blade 22 (as mounted on the hub 20) may be selected to ensure that the winches 112 are spaced sufficiently apart from the rotor blade 22 to allow for the orientation of the blade 22 to be adjusted and/or controlled as it is lowered from the hub 20. For example, as shown in FIG. 6, the winches 112 may be positioned a horizontal distance 142 from the rotor blade 22, which may vary depending on the overall length of the blade's span 38. In addition, the winches 112 may be spaced apart from one another in a cross-wise direction such that each sock cable 108, 110 extends from the blade sock 100 at a given cable angle. For instance, in one embodiment, the cable angle 144 may range from about 30 degrees to about 60 degrees, such as from about 35 degrees to about 55 degrees or from about 42 degrees to about 48 degrees and any other subranges therebetween.

It should be appreciated that, as an alternative to the winches 112, the sock cables 108, 110 (which may also be referred to as tag lines) may be coupled to and/or held in position by any other suitable device, object and/or person positioned on and/or adjacent to the support surface 13. For instance, in one embodiment, sock cables 108, 110 may simply be held by personnel standing on the support surface 14.

Figure 7:
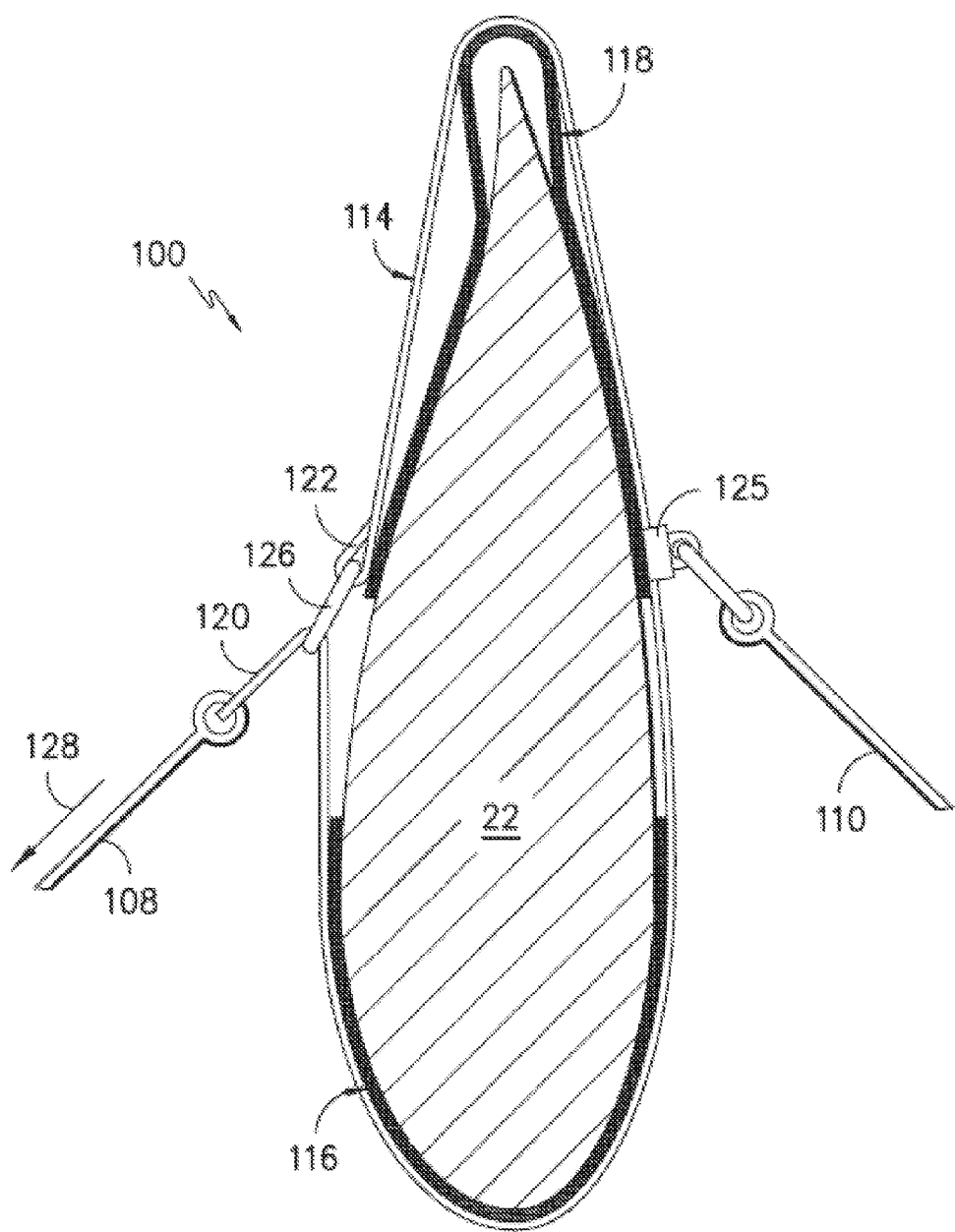
FIG. 7 illustrates a similar cross-sectional view to that shown in FIG. 5, particularly illustrating another embodiment of a blade sock in accordance with aspects of the present invention.

It should be appreciated that, in alternative embodiments, the sock strap 114 may have any other suitable configuration that allows it to be tightened around the rotor blade 22 using the sock cables 108, 110. For instance, instead of being looped around the rotor blade 22 in the partially overlapping manner shown in FIG. 5, the sock strap 114 may be configured similar to a choker-type lifting sling. An example of such a configuration is illustrated, for example, in FIG. 7. As shown in FIG. 7, the sock strap 114 may be configured to be looped around the rotor blade 22 once, with the first end 120 of the sock strap 114 being received through the mount ring 126 secured to the second end 122 of the strap 114. In such an embodiment, by coupling one of the sock cables (e.g., the first sock cable 108) to the first end 120 of the strap 114, the sock cable 108 may be used to apply a tightening force through the sock strap (as indicated by arrow 128) in order to tighten the sock strap 114 around the rotor blade 22.

Figure 8:
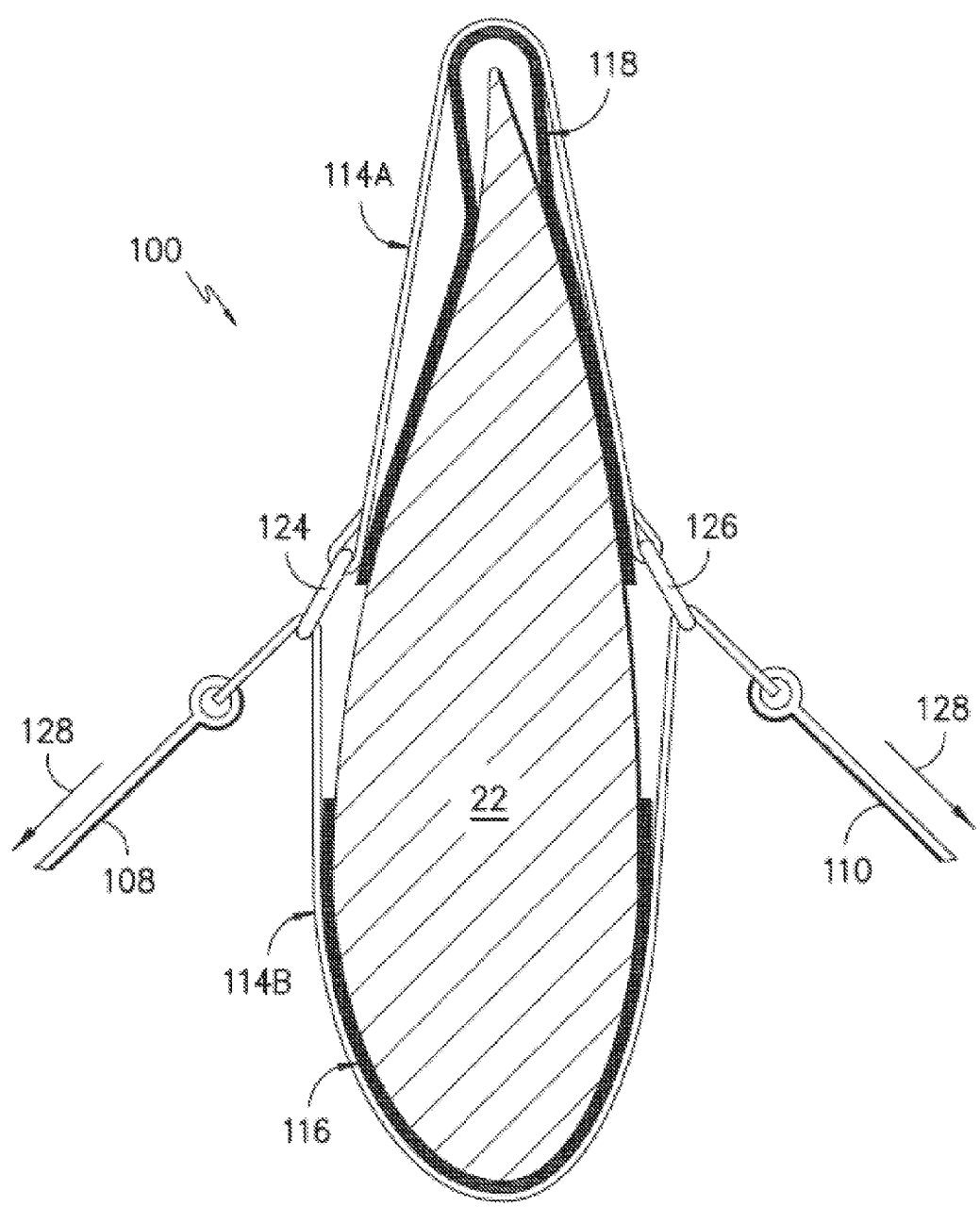
FIG. 8 illustrates a similar cross-sectional view to that shown in FIG. 5, particularly illustrating a further embodiment of a blade sock in accordance with aspects of the present invention.

Alternatively, FIG. 8 illustrates yet another example of a choker-type configuration that may be utilized to allow the sock strap 114 to be self-tightening. As shown, the sock strap is formed from two separate strap portions 114A, 114B. Specifically, the first strap portion 114A may be configured to extend partially around the outer perimeter of the rotor blade 22 between first and second mount rings 124, 126. In addition, the second strap portion 114B may be configured to extend around the remainder of the outer perimeter of the rotor blade 22. In such an embodiment, each end of the second strap portion 114B may be received through one of the mount rings 124, 126 of the first strap portion 114A and coupled to one of the sock cables 108, 110. Thus, each sock cable 108, 110 may be used to apply a tightening force (as indicated by arrows 128) through the first and second strap portions 114A, 114B that allows the sock strap to be tightened around the rotor blade 22.

It should be appreciated that the sock strap 114 (including strap portions 114A, 114B) may generally be formed from any suitable material(s) that allow the strap 114 to function as described herein. For instance, in several embodiments, the sock strap 114 may be formed from a relative strong and/or durable material, such as nylon, Kevlar or any other suitable material typically utilized to form lifting straps and/or slings.

Figure 9:
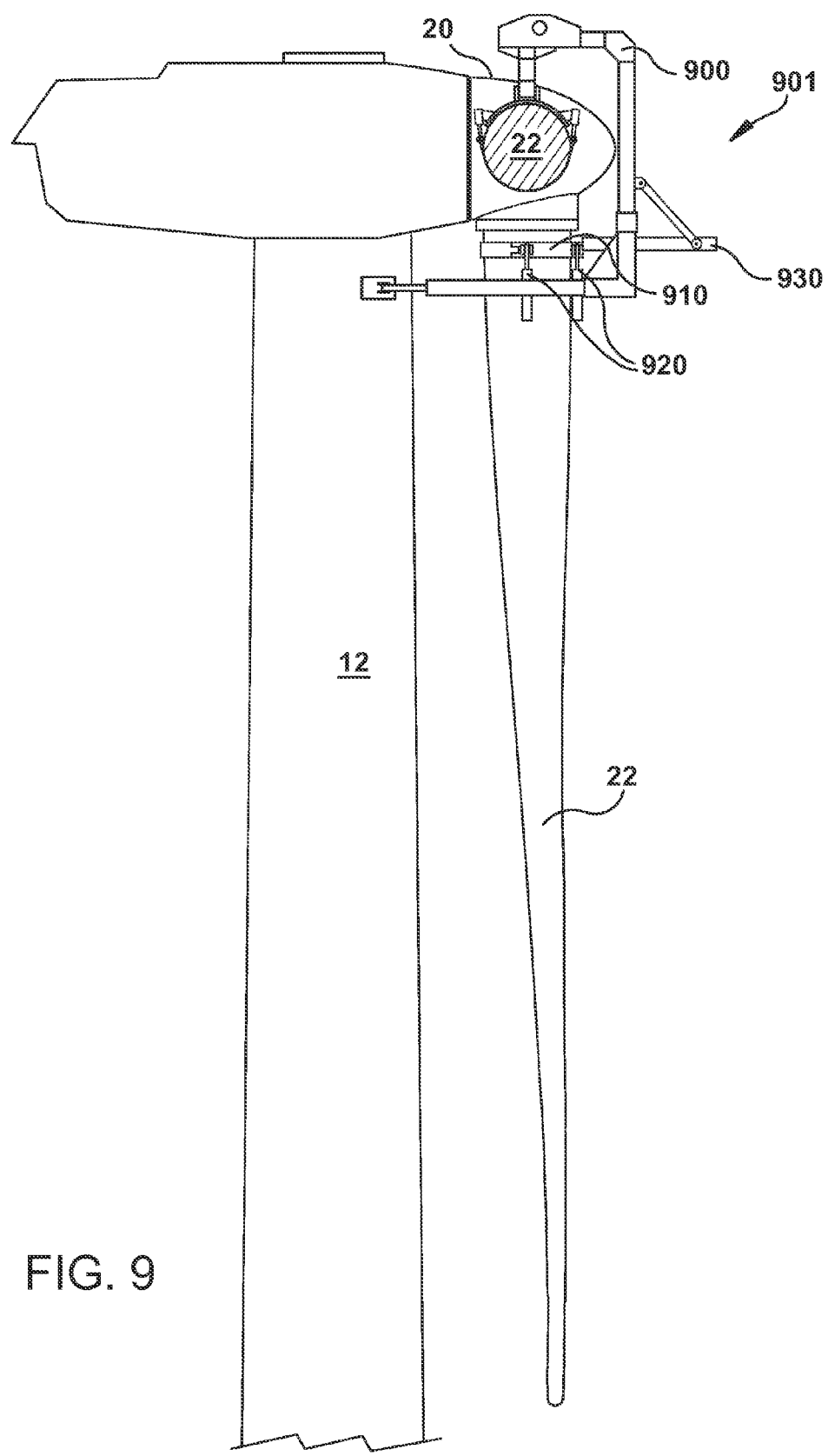
FIG. 9 illustrates a side view of a system for enabling servicing of the rotor, according to an aspect of the present invention.

FIG. 9 illustrates a side view of a system 901 for enabling servicing of the rotor 18, according to an aspect of the present invention. The system 901 includes a rotor servicing fixture 900 that is used to slightly lower a rotor blade 22 so that a rotor part (e.g., a rotor bearing) can be removed or replaced without having to remove the entire rotor 18 from the wind turbine. In FIG. 1, the upper two (e.g., first and second) rotor blades are shown in the 10 o'clock and 2 o'clock positions. The third rotor blade 22 is shown pointing generally downwardly and is in the 6 o'clock position. The rotor servicing fixture 900 is configured to attach to a rotor in this general position, so that the rotor servicing fixture 900 is supported by both the first and second (i.e., the upward pointing) rotor blades. The rotor servicing fixture is also supported by the tower 12.

Figure 10:
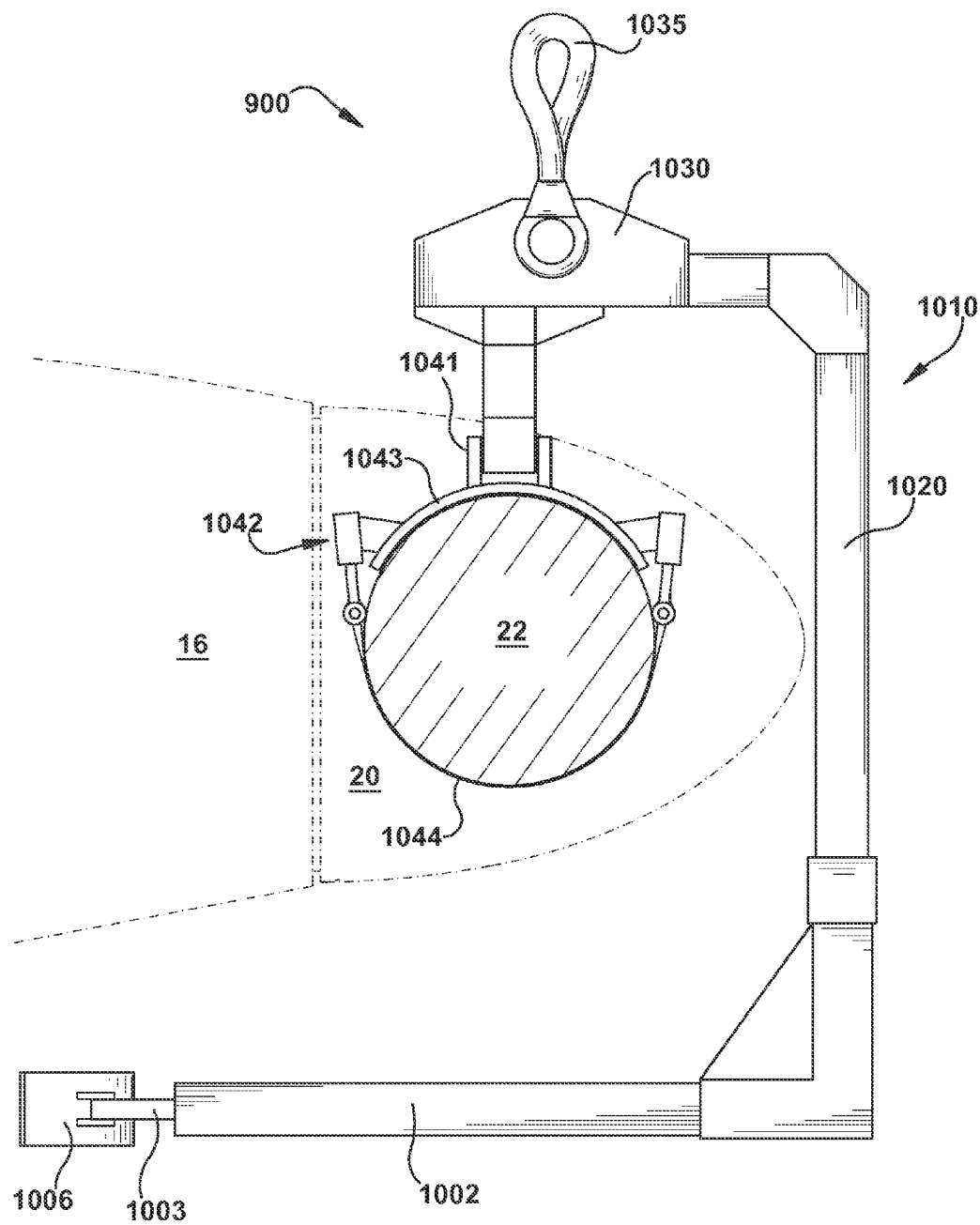
FIG. 10 illustrates a side view of the rotor servicing fixture, according to an aspect of the present invention.

The system 901 includes the rotor servicing fixture 900, a clamp assembly 910, a lifting assembly 920 and a slide assembly 930. FIG. 10 illustrates a side view of the rotor servicing fixture 900. The rotor servicing fixture 900 includes a first leg 1002 and a second leg 1004 (shown in FIG. 11), and both legs are configured to contact the tower 12. An adjustable extension section 1003, 1005 can be linearly adjusted in or out to contact the outer wall of the tower 12. The adjustable extension sections may include padded feet 1006, 1007 to protect the tower. The adjustable extension sections may also lock in place (e.g., with suitable fasteners or stops) to provide a secure base mount for the rotor servicing fixture. As examples only, the legs 1002, 1003 and adjustable extension sections 1003, 1005 could be hydraulic rams or telescoping members that lock in place by the use of pins or bolts.

A main body 1010 includes a vertical support section 1020 that is connected to both the first and second legs 1002, 1003. The vertical support section 1020 is connected to a top section 1030 that includes a lifting member 1035 configured for attachment to a crane (not shown). The lifting member 1035 could be comprised of a reinforced bracket having a through-hole and/or or a shackle or other suitable connector attached to the top section 1030. The top section 1030 is connected to two rotor blade clamp assemblies 1040 (only one shown in FIG. 10), that are configured to attach to the first rotor blade and the second rotor blade (i.e., the rotor blades oriented generally in the 10 o'clock and 2 o'clock positions, respectively). Both the first and second rotor blades remain attached to rotor 18. The rotor blade clamp assemblies 1040 may have a hinged connection 1041 to the top section 1030, and a rotor blade clamp 1042 comprised of a top member 1043 and a lower sling or strap 1044. The strap 1044 may be a ratcheting type of strap to securely lock onto the root section of the first and second rotor blade. There is a rotor blade clamp 1042 for each of the upper rotor blades. When the rotor servicing fixture 900 is securely mounted to the rotor, by attaching the rotor blade clamps 1042 to each of the first and second rotor blades, and by adjusting the lower legs 1002, 1003 to contact the tower 12, the rotor servicing fixture 900 is properly configured to support the third (i.e., 6 o'clock) rotor blade.

Figure 11:
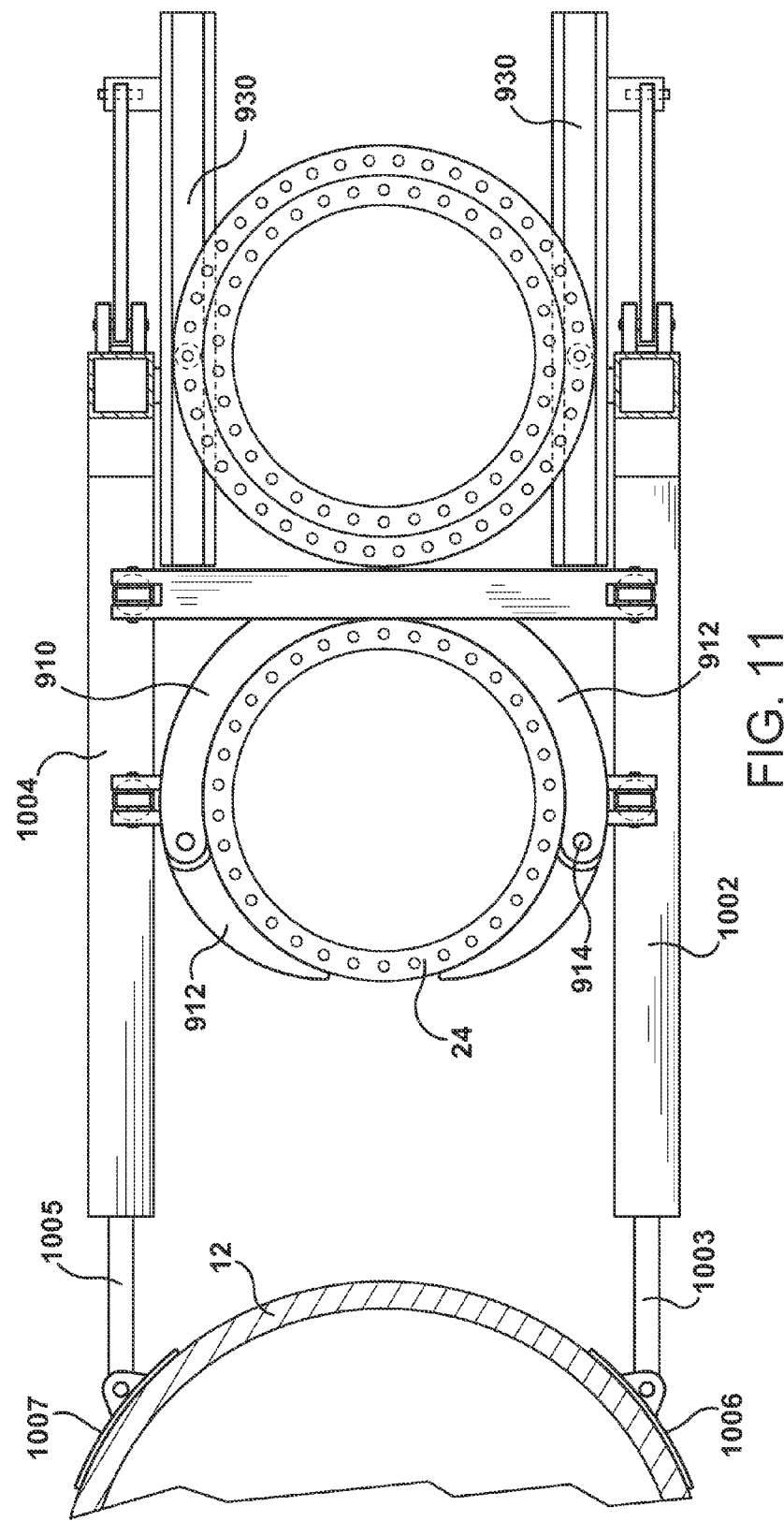
FIG. 11 illustrates a top view of the system and rotor servicing fixture, according to an aspect of the present invention.

FIG. 11 illustrates a top view of the system 901 and rotor servicing fixture 900, according to an aspect of the present invention. The clamp assembly 910 is connected to the rotor servicing fixture 900, so that the weight of the downwardly pointing rotor blade 22 is transferred to the rotor servicing fixture 900. The clamp assembly 910 is configured to clamp onto rotor blade 22 so that it may be lowered from and raised back to hub 20. In the example shown, the third rotor blade 22 is oriented generally in the 6 o'clock position, or in other words rotor blade 22 points generally downward towards the ground or other supporting surface. The clamp assembly 910 is comprised of a generally C-shaped clamp having articulated arms 912. The arms 912 are configured to open to pass over the root section of the third rotor blade 22 and to close and clamp onto the root section. For example, a hinge 914 may be used to pivot a distal end of arm 912 so that it can open and close. The arms 912 may be opened and closed (i.e., activated) manually or by electric, hydraulic or pneumatic systems. Alternatively, the distal ends of arms 912 can be tightened (clamped) around the root section of blade 22 by means of a cable, ratcheting strap or chain. One example of a hydraulically activated clamp will be discussed hereinafter, and in conjunction with FIG. 12. The clamp assembly 910 is attached to the lifting assembly 920, and configured so that the rotor blade 22 may be lowered from the hub 20 (or rotor 18). The blade 22 can be lowered so that a rotor part 1100, such as a blade bearing, can be removed from the blade 22 or installed on blade 22. Alternatively, any suitable hub or rotor part can be removed, replaced or installed by using system 901, such as control boxes, pitch motors, pitch bearings or any other heavy or cumbersome part that would be difficult to bring up through the tower.

Figure 12:
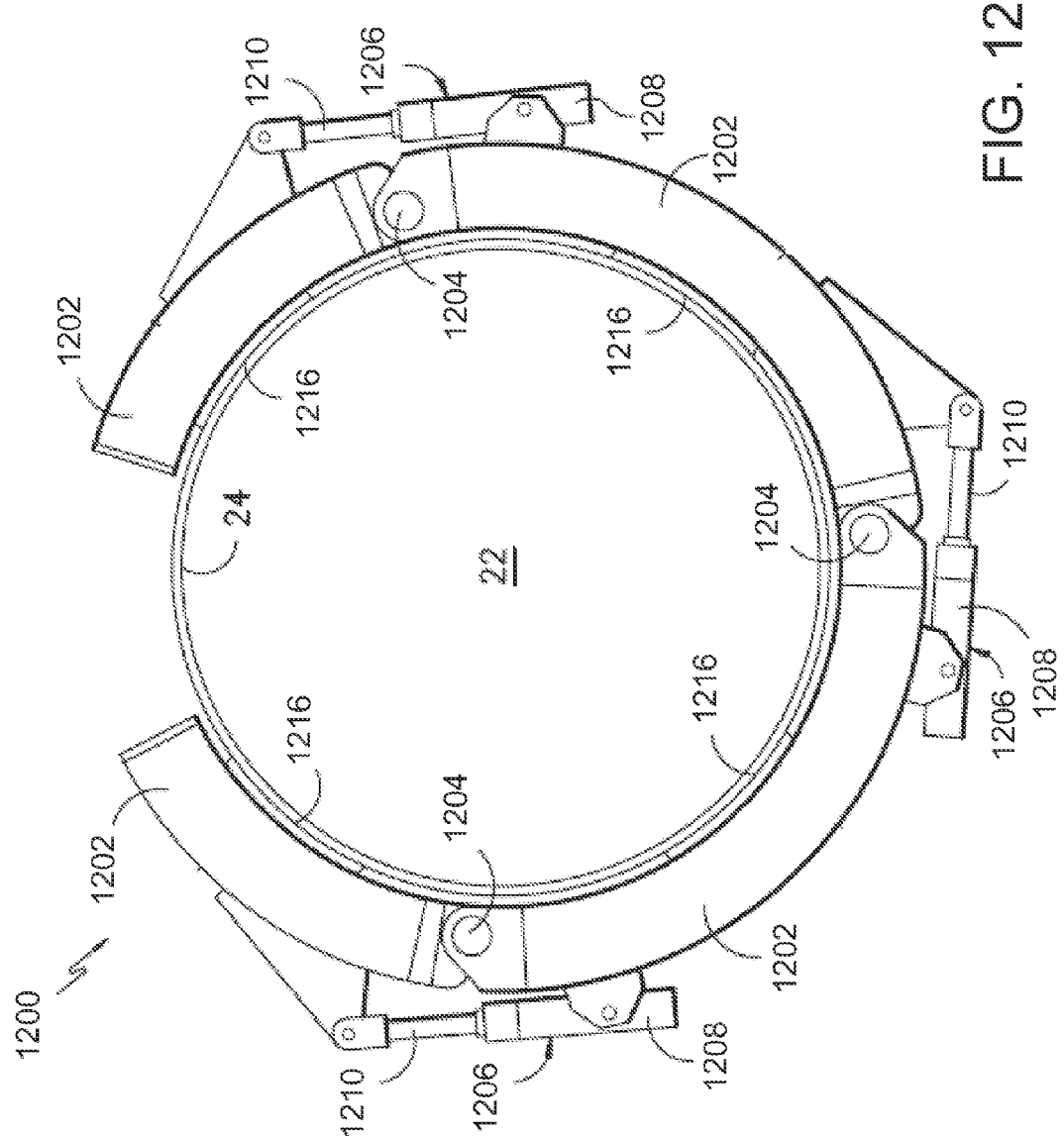
FIG. 12 illustrates a top view of one example of a clamp assembly, according to an aspect of the present invention.

FIG. 12 illustrates a top view of one example of a clamp assembly 1200, according to an aspect of the present invention. In general, the clamp assembly 1200 (which may be used in place of clamp assembly 910) may include a plurality of curved clamp members 1202 configured to be engaged around the outer circumference of the rotor blade 22. Specifically, each clamp member 1202 may be configured to extend circumferentially around a portion of the blade root 24 of the rotor blade 22. In several embodiments, each clamp member 1202 may be configured to be coupled to any adjacent clamp member(s) 1202 via a pivotal connection. For example, as particularly shown in FIG. 12, a hinge pin 1204 may be configured to extend through the ends of each pair of adjacent clamp members 1202, thereby allowing such clamp members to be pivoted or rotated relative to one another. As such, when the clamp assembly 1200 is properly positioned along the blade root 24 at its desired installation location, the clamp members 1202 may be pivoted relative to one another to allow the clamp assembly 1200 to be tightened and/or engaged around the blade root 24.

It should be appreciated that, in general, the clamp members 1202 may be configured to be actuated or otherwise rotated relative to one another using any suitable actuating means known in the art. For example, in several embodiments, a suitable actuating cylinder 1206 (e.g., an electric cylinder, pneumatic cylinder or a fluid-driven or hydraulic cylinder) may be coupled between each pair of adjacent clamp members 1202 so that the cylinder 1206 extends across the joint formed between the clamp members 1202 via the hinge pin 1204. As particularly shown in FIG. 12, each actuating cylinder 1206 may include a piston cylinder 1208 coupled to one of the adjacent clamp members 1202 and a piston rod 1210 coupled to the other adjacent clamp member 1202. As such, when the piston rod 1210 is actuated relative to piston cylinder 1208, the adjacent clamp members 1202 may be rotated relative to one another, thereby allowing the clamp members 1202 to be engaged around and/or disengaged from the rotor blade 22.

It should be appreciated that, in several embodiments, one or more clamp pads 1216 may be secured to one or more of the clamp members 1202 such that the clamp pads 1216 are positioned directly between the clamp member(s) 1202 and the rotor blade 22 when the clamp assembly 1200 is installed around the blade root 24. In one embodiment, the clamp pads 1216 may have a friction coating or surface that allows for improved gripping of the rotor blade surface when the clamp members 1202 are engaged around the blade root 24. Alternatively, the clamp pads 1216 may be formed from a foamed material or other suitable cushioning material so as to provide a layer of protection for the outer surface of the rotor blade 22.

Figure 13:
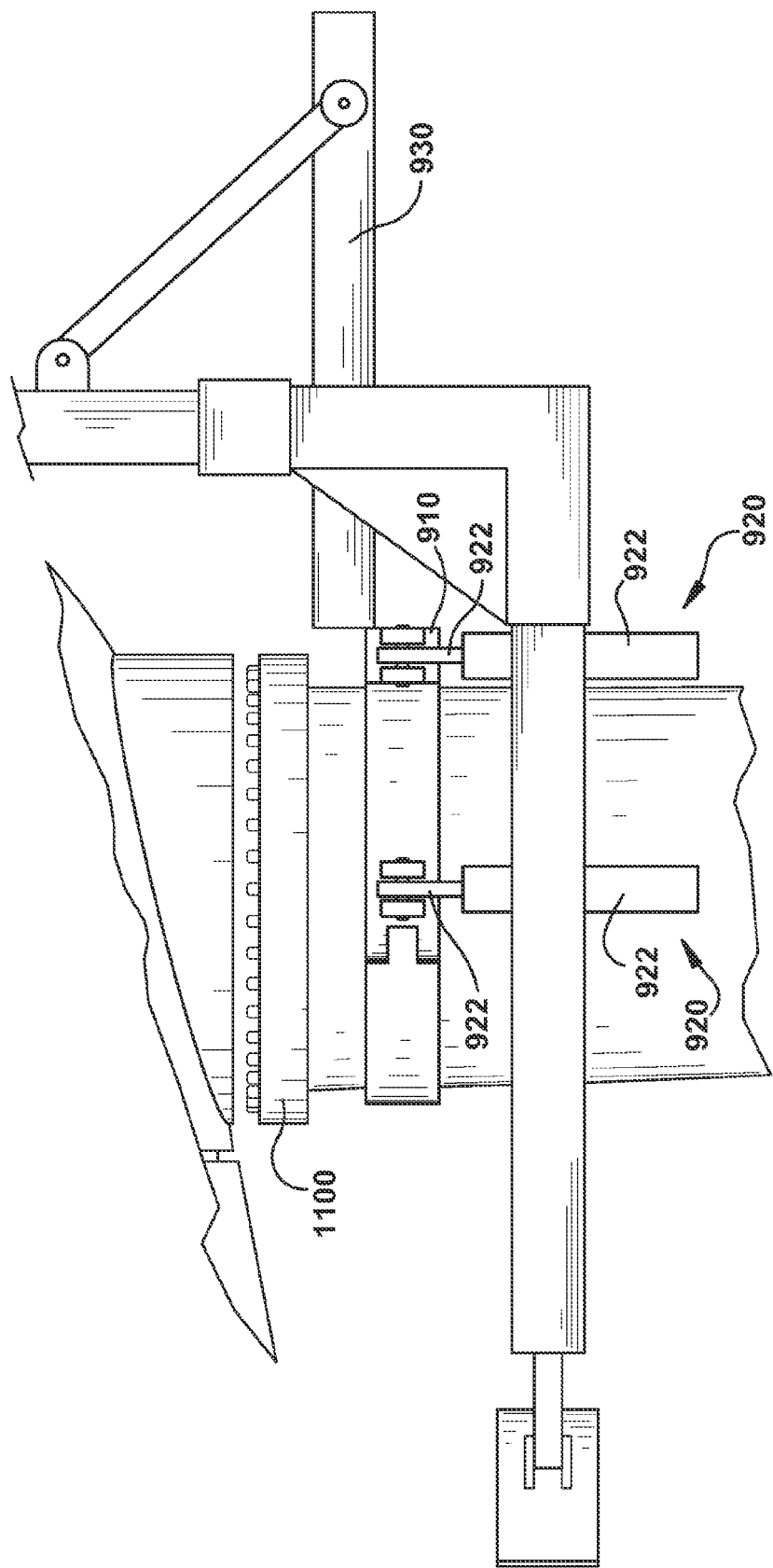
FIG. 13 illustrates a partial side view of the lifting assembly, according to an aspect of the present invention.

FIG. 13 illustrates a partial side view of the lifting assembly 920, according to an aspect of the present invention. The lifting assembly 920 is connected to the rotor servicing fixture 900 and the clamp assembly 910, and is configured to raise and lower the rotor blade 22 via the clamp assembly 910. The lifting assembly includes a plurality of cylinders 922 that are configured to raise and lower. For example, the plurality of cylinders 922 may be hydraulically activated, pneumatically activated, electrically activated or mechanically activated. In the example shown, four cylinders 922 are used to raise and lower the third rotor blade 22. To remove a blade or pitch bearing, the clamp assembly 910 is clamped around the root section 24, and then the lifting assembly can lower the blade 22 enough to allow the pitch bearing 1100 to be removed. The old pitch bearing can be transferred over to slide assembly 930 and picked up and removed by a crane. A new pitch bearing can be brought up and installed. After installation, the blade 22 can be raised back up to the hub 20 by the lifting assembly 920 and the rotor blade 22 can be re-attached to the rotor 18/hub 20.

Figure 14:
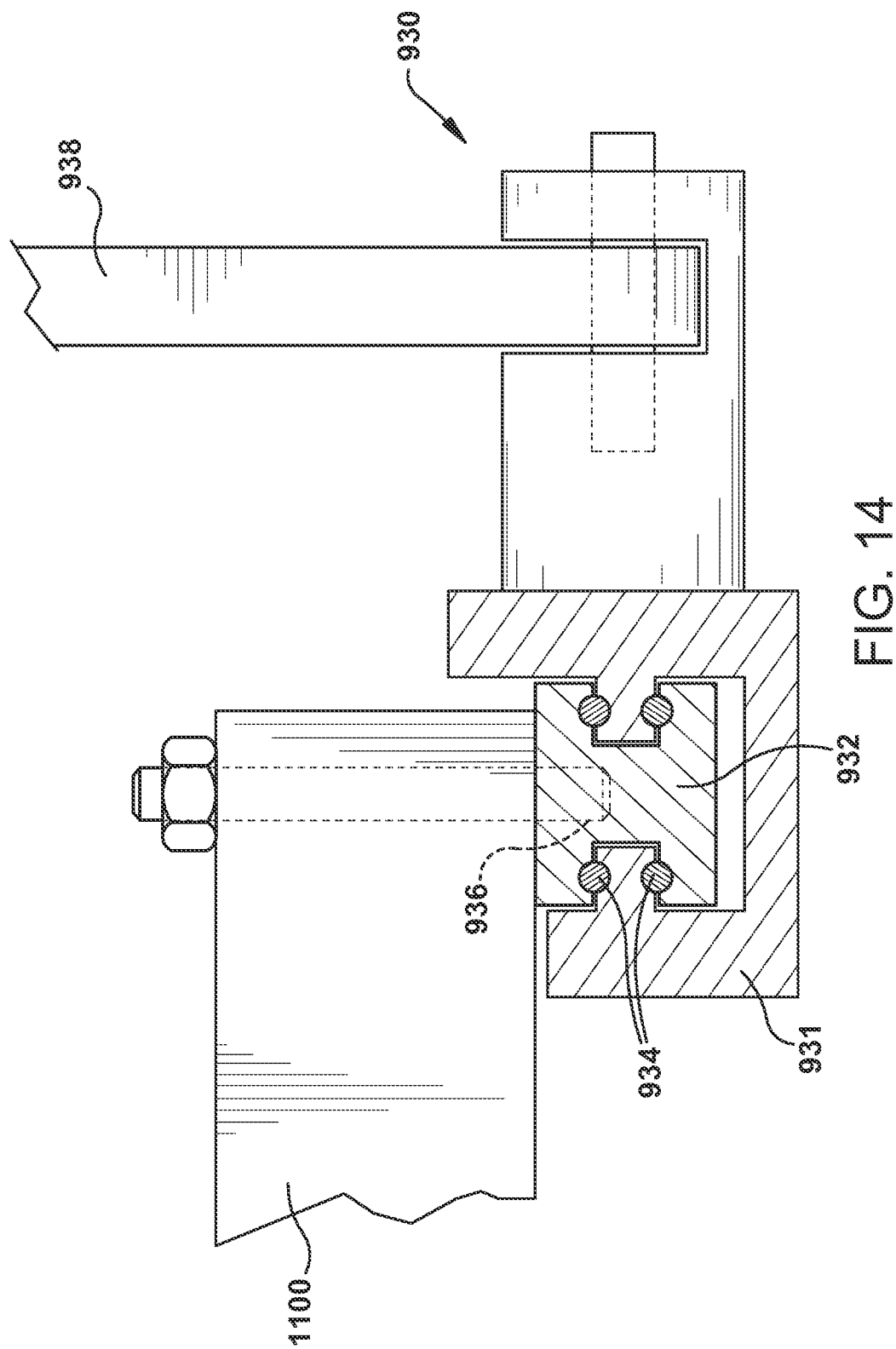
FIG. 14 illustrates a partial, cross-sectional view of the slide assembly, according to an aspect of the present invention.

FIG. 14 illustrates a partial, cross-sectional view of the slide assembly 930. The slide assembly 930 has at least two sliding rails 932 that are configured to slide back and forth (i.e., linearly) along frame rails 931. The rotor part 1100 can be rested upon (or attached to) the sliding rails 932, so that the rotor part 1100 can be moved away from or towards the wind turbine 10. The sliding rails 932 may ride on a plurality of bearings 934 to aid in linear translation of the rails 932. In addition, one or more threaded holes 936 may be provided for attachment of the rotor part, if desired. The slide assembly 930 can be attached to the rotor servicing fixture by a plurality of support members 938.

Figure 15:
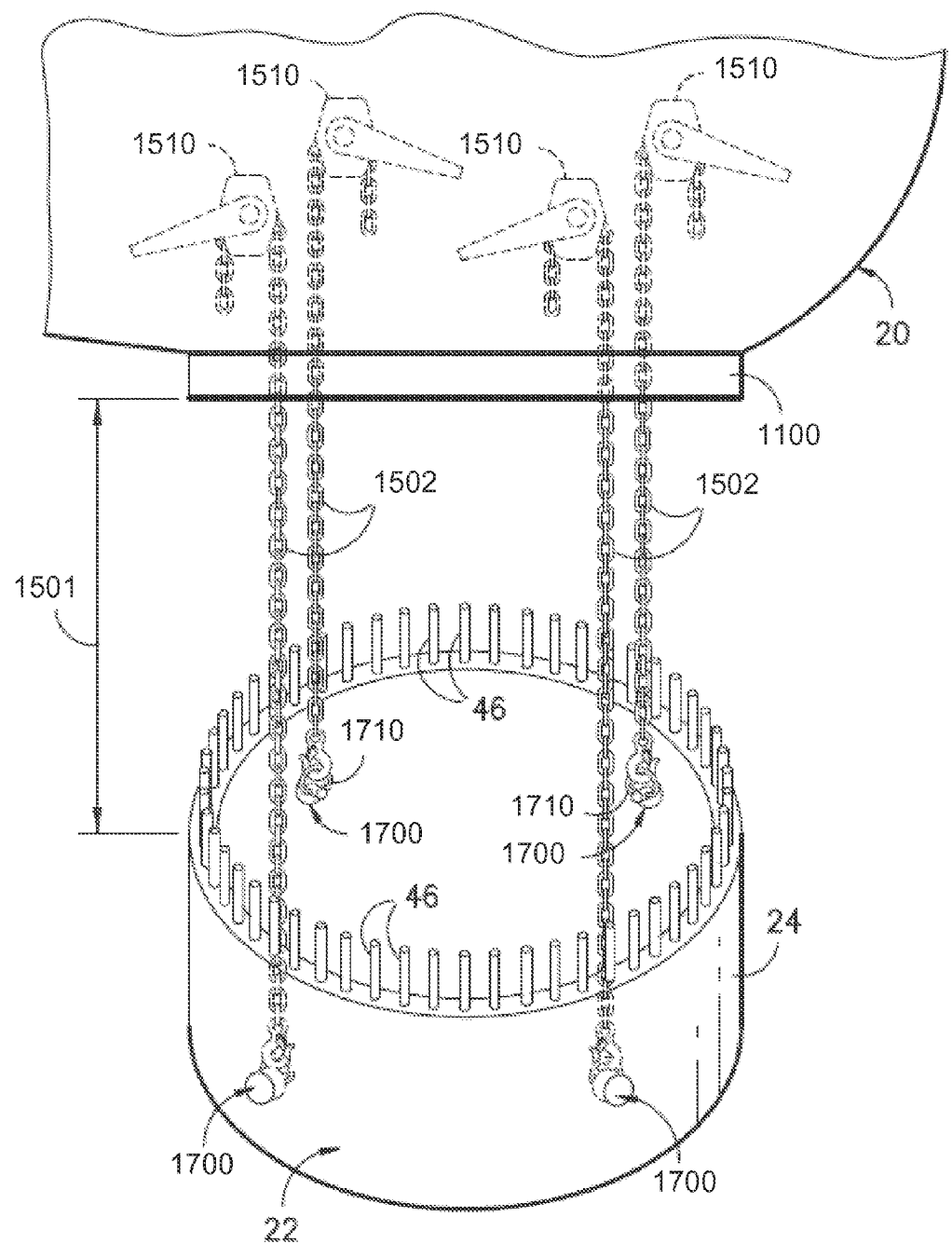
FIG. 15 is a close-up, partial perspective view of a rotor blade and the hub, particularly illustrating another embodiment of a lifting/lowering system including support cables/chains secured to the rotor blade and corresponding cable translation devices positioned within the hub.
Figure 16:
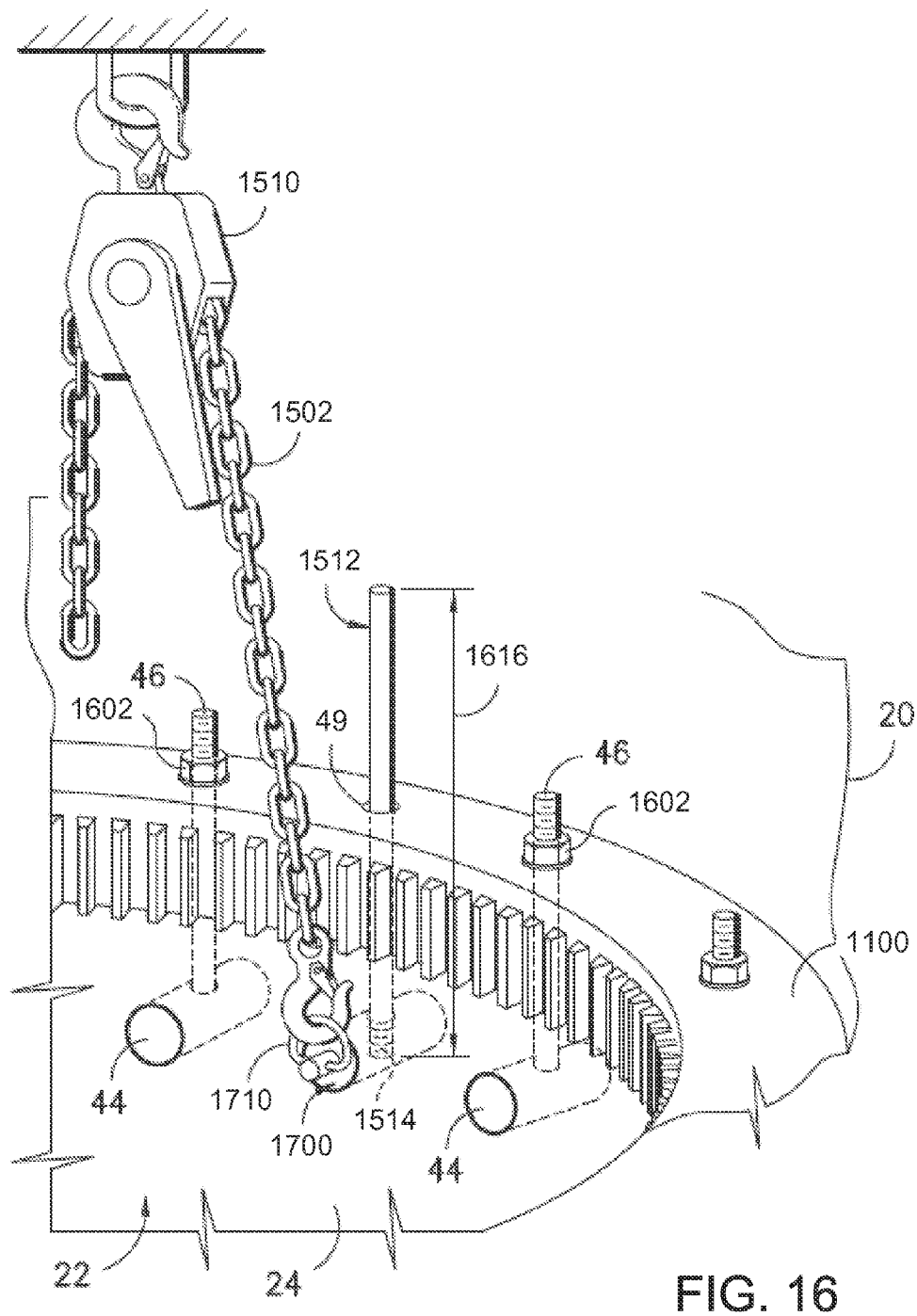
FIG. 16 illustrates a close-up, partial perspective view of the interface between the rotor blade and the pitch bearing shown in FIG. 15 prior to the rotor blade being lowered from the hub, particularly illustrating a support cable coupled between a support nut installed within the blade root and a corresponding cable translation device positioned within the hub.
Figure 17:
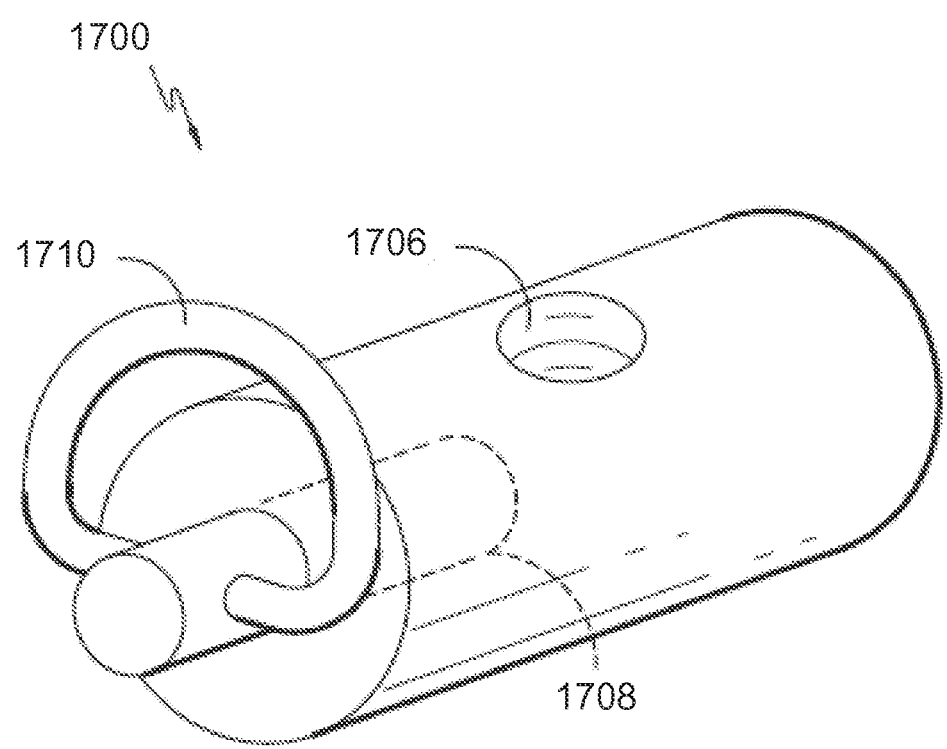
FIG. 17 illustrates a perspective view of the support nut shown in FIG. 15.

Referring now to FIGS. 15-17, another embodiment of suitable components that may be included within a lowering system to initially lower the rotor blade 22 from the hub 20 is illustrated in accordance with aspects of the present subject matter. Specifically, FIG. 15 illustrates a partial perspective view of the hub 20, the rotor blade 22 and the pitch bearing 1100 of the wind turbine 10 after the blade 22 has been lowered from the hub 20 by an initial vertical distance 1501. FIG. 16 illustrates a partial, perspective view of the interior of the hub 20 at the interface between the rotor blade 22 and the pitch bearing 1100 prior to the blade 22 being lowered relative to the hub 20. Additionally, FIG. 17 illustrates a perspective view of one embodiment of a modified barrel-type support nut 1700 configured for use in the illustrated lowered system in accordance with aspects of the present invention.

As particularly shown in FIGS. 15 and 16, to allow the rotor blade 22 to be initially lowered, several of the root bolts 46 extending through the bolt holes 49 defined in the pitch bearing 1100 may be removed. The existing barrel nuts 44 associated with such bolts 46 may then be replaced with cylindrically-shaped support nuts 1700, with each support nut 1700 being configured to allow a corresponding support cable 1502 to be coupled to the blade root 24. For example, as shown in FIG. 15, in one embodiment, four of the existing barrel nuts 44 may be removed and replaced with suitable support nuts 1700. In doing so, the remainder of the root bolts 46 may be initially maintained in engagement with the pitch bearing 1100 (e.g., via suitable attachment nuts 1602 to allow the rotor blade 22 to continue to be supported by the hub 20 until the rotor blade 22 is ready to be lowered.

It should be appreciated that the support nuts 1700 may generally have any suitable configuration that allows each support nut 1700 to be inserted through the blade root 24 in place of one of the existing barrel nuts 44 as well as to provide a means for coupling each support cable 1502 to the rotor blade 22. For example, in one embodiment, each support nut 1700 may be configured as a modified barrel nut. For instance, as shown in FIG. 17, each support nut 1700 may include a threaded opening 1706 extending vertically through the support nut 1700 to allow a corresponding root bolt 46 or other suitable threaded member to be coupled to the nut 1700 and extend vertically therefrom. In addition, each support nut 1700 may include a laterally extending threaded opening 1708 defined through one of the sides of the nut 1700. The opening 1708 may allow for a suitable coupling device 1710 (e.g., a swivel eye, mount ring, mount hook or any other suitable attachment mechanism) to be secured to the support nut 1700 for coupling each support cable 1502 to the rotor blade 22.

As indicated above, in one embodiment, four support nuts 1700 may be installed through the blade root 24 in place of the existing barrel nuts 44 to allow four corresponding support cables 1502 to be coupled to the rotor blade 22. However, in other embodiments, any other suitable number of support nuts 1700 may be secured within the blade root 24 to provide a means for coupling a corresponding number of support cables 1502 to the rotor blade 22, such as by installing less than four support nuts 1700 within the blade root 24 (e.g., two or three support nuts) or greater than four support nuts 1700 within the blade root 24 (e.g., five, six or more support nuts).

Additionally, it should be appreciated that the support nuts 1700 may be configured to be maintained in position relative to the rotor blade 22 using any suitable attachment means. For instance, in one embodiment, once a given support nut 1700 is inserted within the blade root 24, a corresponding root bolt 46 may be inserted through the pitch bearing 1100 and screwed into the vertically extending opening 1706 of the support nut 1700 in order to secure the nut 1700 within the blade root 24. Alternatively, as shown in FIG. 16, an alignment pin 1512 may be configured to be inserted through the pitch bearing 1100 and screwed into the vertically extending opening 1706 of each support nut 1700. In such an embodiment, each alignment pin 1512 may generally be configured for attachment within the corresponding support nut 1700 in a manner similar to the existing root bolts 46 and, thus, may include a threaded end 1514 for engaging the threaded opening 1706 of the support nut 1700. Each alignment pin 1512 may define a vertical height or length 1616 that is greater than the length of the root bolts 46. Accordingly, the alignment pins 1512 may also be utilized to align the rotor blade with the pitch bearing as the rotor blade (or a different rotor blade with the alignment pins installed therein) is being lifted up onto the hub.

Each support cable 1502 may be configured to extend from one of the support nuts 1700 to a corresponding cable translation device 1510 positioned within the hub 20. As shown and in one embodiment, the cable translation device 1510 may correspond to cable hoists (including chain hoists) configured to be mounted to and/or supported by any suitable wind turbine component(s) positioned within the hub 20 (e.g., the hub gusset(s), joist(s) and/or any other suitable component(s)). As is generally understood, cable hoists may be configured to allow suitable cables to be passed therethrough in a controlled manner. Thus, in the present application, such cable hoists may be utilized to safely and effectively lower the rotor blade 22 relative to the hub 20.

It should be appreciated that, in alternative embodiments, the cable translation devices 1510 may correspond to any other suitable devices and/or mechanisms that allow for the rotor blade 22 to be lowered relative to the hub 20 via the corresponding support cables 1502. For instance, in another embodiment, the cable translation devices 1510 may correspond to winches positioned within the hub 20.

It should also be appreciated that, similar to the support cables described above, each support cable 1502 may generally correspond to any suitable elongated cable-like object that has a rated load capacity sufficient to handle the weight of the rotor blade 22. For instance, as shown in the illustrated embodiment, the support cables 1502 are configured as metal chains. However, in other embodiments, the support cables 1502 may correspond to steel cables or any other suitable wire ropes. Moreover, it should be appreciated that each support cable 1502 may generally be configured to define any suitable length that permits the cables 1502 to be utilized to lower the rotor blade 22 away from the hub 20 by the initial vertical distance 1501. The support cables 1502 may also be connected to blade 22 by cutting a hole into the blade root 24 to install an attachment to the root bolts 46.

Figure 18:
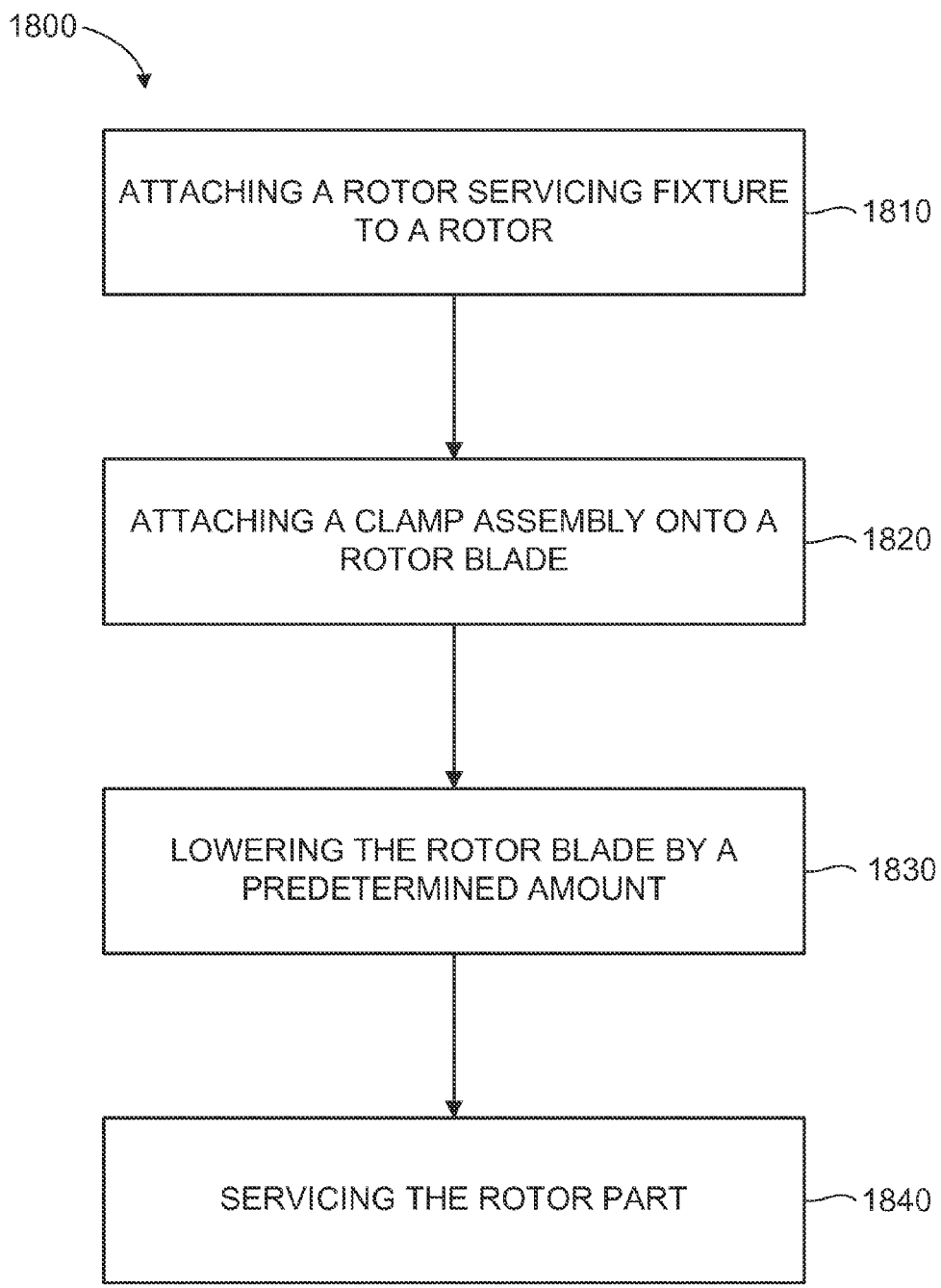
FIG. 18 is a flow chart of a method for servicing a rotor, according to an aspect of the present invention.

FIG. 18 is a flowchart of a method 1800 for servicing a rotor 18 of a wind turbine 10, according to an aspect of the present invention. The method 1800 includes the steps of, attaching 1810 a rotor servicing fixture 900 to the rotor 18, attaching 1820 a clamp assembly 910 onto a rotor blade 22, lowering 930 the rotor blade 22 by a predetermined amount and servicing 940 a rotor part 1100. For the attaching step 1810, the rotor servicing fixture may be brought to the rotor 18/hub 20 with a crane (not shown). An advantage of the present invention is that a smaller and cheaper crane may be used for this operation, as the crane need only lift and transport the rotor servicing fixture 900 and not the entire rotor 18. The rotor 18 is much heavier than the rotor servicing fixture. The rotor servicing fixture 900 is attached to and supported by a first rotor blade and a second rotor blade. The first and second rotor blades would preferably be oriented in the 10 o'clock and 2 o'clock positions. In addition, a lower part of the rotor servicing fixture contact the tower 12 of the wind turbine 10.

In the attaching step 1820, the clamp assembly 910 is attached to a third rotor blade 22. The third rotor blade would be oriented in the 6 o'clock position (or pointing generally downwardly). The clamp assembly 910 is now clamped onto the third rotor blade by a pair of articulated arms. The clamp assembly can now support the weight of the third rotor blade via the lifting assembly and rotor servicing fixture. The lowering step 1830 lowers the third rotor blade by a predetermined amount with the clamp assembly 910 and the lifting assembly 920. The predetermined amount may be about 3 to about 6 feet, or any suitable amount as desired in the specific application. As one example only, if the pitch bearing is being replaced, then the predetermined amount would have to be large enough to allow for the pitch bearing to be removed and a new pitch bearing to be installed. Both the clamp assembly and the lifting assembly are configured to lower the third rotor blade from the hub and to raise the third lower blade back to the hub. When servicing is complete the third rotor blade can be lifted up and re-installed/attached back onto the hub.

In the servicing step 1840, the rotor part is serviced. This could include, removing, replacing repairing or installing the rotor part. The rotor part may be a pitch bearing, pitch motor, pitch controller or any other part or system that is in the blades or hub. The servicing is performed without removing the rotor from the wind turbine. As mentioned before, this is a very big advantage as the entire rotor does not have to be removed from the wind turbine to service the rotor part. A transporting step, transports the rotor part with a slide assembly. The slide assembly supports the rotor part and is configured to slidably move the rotor part away from or towards the wind turbine. For example, a pitch bearing can be removed from the blade/hub and slid outwards so that it can be picked up and moved away with a crane. A new pitch bearing can be brought up, placed on the slide assembly and slid into place for installation. When the rotor is re-assembled (and all desired servicing is complete), the rotor servicing fixture and its associated parts can be detached from the rotor and carried away from the rotor using a crane (not shown).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A system for enabling servicing of a rotor of a wind turbine comprising:
    a rotor servicing fixture configured to attach to and be supported by a first rotor blade and a second rotor blade, the rotor servicing fixture configured to contact a tower of the wind turbine;
    a clamp assembly connected to the rotor servicing fixture, the clamp assembly configured to clamp onto a third rotor blade, the clamp assembly configured to lower the third rotor blade from a hub and to raise the third rotor blade back to the hub;
    a lifting assembly connected to the rotor servicing fixture and the clamp assembly, the lifting assembly configured for raising and lowering the third rotor blade via the clamp assembly;
    a slide assembly connected to the rotor servicing fixture, the slide assembly configured to support the rotor part and to slidably move the rotor part away from or towards the wind turbine; and
    wherein the system enables the rotor part to be removed or replaced without requiring the rotor to be removed from the wind turbine.

2. The system of claim 1, the rotor servicing fixture further comprising:
    a first leg and a second leg, both the first leg and the second leg configured to contact the tower of the wind turbine; and
    wherein both the first leg and the second leg comprise adjustable extension sections.

3. The system of claim 2, the rotor servicing fixture further comprising:
    a main body having a vertical support section connected to the first leg and the second leg, the vertical support section connected to a top section having a lifting member configured for attachment to a crane;
    the top section is connected to two rotor blade clamp assemblies that are configured to attach to the first rotor blade and the second rotor blade when both the first rotor blade and the second rotor blade remain attached to the rotor; and wherein the first rotor blade is oriented generally at a 10 o'clock position and the second rotor blade is oriented generally at a 2 o'clock position.

4. The system of claim 1, the clamp assembly further comprising:
    a generally C-shaped clamp having articulated arms, the arms configured to open to pass over a root section of the third rotor blade and to close and clamp onto the root section.

5. The system of claim 4, wherein the articulated arms are at least one of:
    hydraulically activated, pneumatically activated or tightened around the root section with a cable, a strap or a chain.

6. The system of claim 1, the lifting assembly further comprising:
    a plurality of cylinders configured to raise or lower; and
    wherein the plurality of cylinders are hydraulically activated or pneumatically activated.

7. The system of claim 1, the slide assembly further comprising:

a frame having at least two sliding rails, wherein the rails slide back and forth to permit the rotor part to be moved away from or towards the wind turbine.

8. The system of claim 1, wherein the rotor part is a pitch bearing.

* * * * *